United States Patent
Wang et al.

(10) Patent No.: US 12,425,840 B2
(45) Date of Patent: Sep. 23, 2025

(54) METHOD FOR CHECKING UE CAPABILITY MATCH, AMF, BASE STATION AND STORAGE MEDIUM

(71) Applicant: DATANG MOBILE COMMUNICATIONS EQUIPMENT CO., LTD., Beijing (CN)

(72) Inventors: Hucheng Wang, Beijing (CN); Ye Zhou, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 506 days.

(21) Appl. No.: 17/795,229

(22) PCT Filed: Jan. 26, 2021

(86) PCT No.: PCT/CN2021/073839
§ 371 (c)(1),
(2) Date: Jul. 26, 2022

(87) PCT Pub. No.: WO2021/159958
PCT Pub. Date: Aug. 19, 2021

(65) Prior Publication Data
US 2023/0052146 A1    Feb. 16, 2023

(30) Foreign Application Priority Data
Feb. 14, 2020    (CN) .......................... 202010093612.5

(51) Int. Cl.
*H04W 8/22*    (2009.01)
*H04L 5/00*    (2006.01)
(Continued)

(52) U.S. Cl.
CPC ............. *H04W 8/22* (2013.01); *H04L 5/0053* (2013.01); *H04L 65/1016* (2013.01); *H04W 48/18* (2013.01); *H04W 60/04* (2013.01)

(58) Field of Classification Search
CPC ....... H04W 8/22; H04W 48/18; H04W 60/04; H04L 5/0053; H04L 65/1016
See application file for complete search history.

(56) References Cited

U.S. PATENT DOCUMENTS

2017/0078926 A1    3/2017    Zhu et al.
2018/0324877 A1    11/2018    Tiwari
(Continued)

FOREIGN PATENT DOCUMENTS

CN    110447266 A    11/2019
WO    2012111409 A1    8/2012
(Continued)

OTHER PUBLICATIONS

Qualcomm Incorporated, "Radio Capability Check for IMS Voice", 3GPP TSG-RAN WG3 #97bis, Prague, Czech Republic, Oct. 9-13, 2017, total 7 pages, R3-173738.
(Continued)

*Primary Examiner* — Wayne H Cai
(74) *Attorney, Agent, or Firm* — KILPATRICK TOWNSEND & STOCKTON LLP (57) ABSTRACT

Embodiments of the present application provide methods for checking UE capability match, an AMF, a base station, and a storage medium. The method includes: determining to send a UE capability match request to a base station during a registration procedure initiated by the UE; sending a request for setting up a UE's access stratum (AS) security context to the base station, and sending the UE capability match request to the base station after it is determined that the base station completes setup of the AS security context;
(Continued)

receiving a UE capability match acknowledgement returned from the base station. By the method according to the embodiment of the application, the problem that the base station does not respond to the UE capability match process requested by the AMF, which results in that the AMF cannot issue an indication of IMS voice over PS session to the UE during the registration process.

20 Claims, 5 Drawing Sheets

(51) Int. Cl.
*H04L 65/1016* (2022.01)
*H04W 48/18* (2009.01)
*H04W 60/04* (2009.01)

(56) References Cited

U.S. PATENT DOCUMENTS

| | | | |
|---|---|---|---|
| 2021/0029618 A1* | 1/2021 | Jain | H04W 48/04 |
| 2022/0007183 A1* | 1/2022 | Olsson | H04W 12/047 |
| 2022/0210859 A1* | 6/2022 | Guo | H04W 12/106 |

FOREIGN PATENT DOCUMENTS

| | | | |
|---|---|---|---|
| WO | 2018016927 A1 | 1/2018 | |
| WO | 2020106204 A1 | 5/2020 | |

OTHER PUBLICATIONS

Samsung, "Solution for key issue #2: Provisioning of UE Radio Capability Information", SA WG2 Meeting #128-bis, Aug. 20-24, 2018, Sophia Antipolis, France, total 4 pages, S2-187845.
3GPP TS 23.502 V16.3.0, 3rd Generation Partnership Project; Technical Specification Group Services and System Aspects; Procedures for the 5G System (5GS); Stage 2 (Release 16), total 558 pages, Dec. 2019.
Japanese Patent Office, Decision of Rejection Issued in Application No. 2022-549003, Sep. 4, 2023, 3 pages.
Nokia et al., "23.502: OI#21: As security context setup", SA WG2 Meeting #124, Nov. 27-Dec. 1, 2017, Reno, Nevada, USA, total 13 pages, S2-179302.
Qualcomm Incorporated,"Remaining Issues in UE Radio Capability for IMS Voice", 3GPP TSG-RAN WG2 Meeting #103bis, Chengdu, China, Oct. 8-12, 2018, total 6 pages, R2-1814226.
State Intellectual Property Office of the People's Republic of China, Search Report Issued in Application No. 2020100936125, Jun. 28, 2022, total 2 pages.
Korean Intellectual Property Office, First Office Action Issued in Application No. 10-2022-7030138, Dec. 26, 2023, 5 pages.
LG Electronics, "Clarification on UE Capability Match Request procedure", 3GPP TSG-SA WG2 Meeting #128, Jul. 2-6, 2018, Vilnius, Lithuania, total 3 pages, S2-186584.
European Patent Office, Extended European Search Report Issued in Application No. 21753587.1, Feb. 8, 2024, Germany, 5 pages.
Nokia et al., "Way Forward on Feature Compatibility check in Ran", 3GPP TSG-RAN WG3 #97bis, Prague, Czech Republic, Oct. 9-13, 2017, total 3 pages, R3-174159.

* cited by examiner

METHOD FOR CHECKING UE CAPABILITY MATCH, AMF, BASE STATION AND STORAGE MEDIUM

CROSS-REFERENCE TO RELATED APPLICATIONS

The present application is a US National Stage of International Application No. PCT/CN2021/073839, filed on Jan. 26, 2021, which claims priority to Chinese application No. 202010093612.5 filed on Feb. 14, 2020, entitled "Method for Checking UE Capability Match, AMF, Base Station and Storage Medium", which are hereby incorporated by reference in their entireties.

FIELD

The present application relates to the field of wireless communication, and in particular, to a method for checking UE capability match, an AMF, a base station, and a storage medium.

BACKGROUND

Before sending an indication of an IP multimedia subsystem (IMS) voice over PS session to a user equipment (UE), an access and mobility management function physical device (AMF) needs to perform a UE capability match procedure in which the AMF sends a capability match request of the UE to the base station, namely the AMF needs to request the base station for checking whether the UE radio capability and base station capability match; and the AMF sends an indication of IMS voice over PS session to the UE after the UE radio capability match is determined.

However, according to the requirement of 3GPP SA3, the 5G base station needs to activate the access stratum security (AS security) of the UE when acquiring the UE radio capability from the UE. In the related art, if the UE does not have set up a user plane connection during the process of the UE being registered into the network, the base station may not set up an access stratum security context (AS security context) for the UE, and therefore, during the registration, the base station is unable to acquire the UE radio capability, that is, the base station is unable to determine whether the UE radio capability matches, and thus the AMF is unable to send the indication of the IMS voice over PS session during the registration, which results in the UE being unable to initiate IMS voice services.

SUMMARY

To solve the problems in the related art, embodiments of the present application provide methods for checking UE capability match, AMFs, base stations, and storage mediums.

In one embodiment of the present application provides a method for checking UE capability match, including:
  determining to send a UE capability match request to a base station during a registration procedure initiated by the UE;
  sending a request for setting up a UE's access stratum (AS) security context to the base station, and sending the UE capability match request to the base station after it is determined that the base station completes setup of the AS security context; and
  receiving a UE capability match acknowledgement returned from the base station;
  where the UE capability match acknowledgement is generated by the base station according to UE capability information, and the UE capability information is acquired from the UE by the base station after the setup of the AS security context is completed.

In an embodiment, the determining to send the UE capability match request to the base station includes:
  acquiring UE's relevant information, and determining to send the UE capability match request after determining that the UE is to use an IP multimedia subsystem (IMS) voice service according to the UE's relevant information;
  where the relevant information includes at least one of the following information: UE's usage setting information, UE's access network information, and UE's subscription information.

In an embodiment, the determining that the UE is to use the IMS voice service according to the UE's relevant information includes:
  when the UE's usage setting information is voice centric, determining that the UE is to use the IMS voice service; or
  when a network slice identified by single network slice selection assistance information (S-NSSAI) requested in the UE's access network information is able to access the IMS voice service, determining that the UE is to use the IMS voice service; or
  when an IP multimedia subsystem access point name (IMS APN) is included in the UE's subscription information, determining that the UE is to use the IMS voice service.

In another embodiment of the present application provides another method for checking UE capability match, including:
  determining to send a UE capability match request to a base station during a registration procedure initiated by the UE;
  sending the UE capability match request to the base station, where the UE capability match request carries indication information for indicating the base station to ignore a UE AS security context; and
  receiving a UE capability match acknowledgement returned from the base station;
  the UE capability match acknowledgement is generated by the base station according to UE capability information, and the UE capability information is acquired from the UE by the base station in case that the UE AS security context is ignored according to the indication information.

In an embodiment, the determining to send the UE capability match request to the base station includes:
  acquiring UE's relevant information, and determining to send the UE capability match request after determining that the UE is to use an IMS voice service according to the UE's relevant information;
  where the relevant information includes at least one of the following information: UE's usage setting information, UE's access network information, and UE's subscription information.

In an embodiment, the determining that the UE is to use the IMS voice service according to the UE's relevant information includes:
  when the UE's usage setting information is voice centric, determining that the UE is to use the IMS voice service; or
  when a network slice identified by single network slice selection assistance information (S-NSSAI) requested in the UE's access network information is able to access the IMS voice service, determining that the UE is to use the IMS voice service; or when an IP multimedia subsystem access point name (IMS APN) is included in the UE's subscription information, determining that the UE is to use the IMS voice service.

In one embodiment of the present application provides another method for checking UE capability match, including:

receiving a UE capability match request sent by an access and mobility management function physical device (AMF) during a registration procedure initiated by the UE, where the UE capability match request carries indication information for indicating a base station to ignore a UE AS security context; and returning a UE capability match acknowledgement to the AMF;

where the UE capability match acknowledgement is generated by the base station according to the UE capability information, and the UE capability information is acquired from the UE by the base station in case that the UE AS security context is ignored according to the indication information.

In an embodiment, the UE capability match request is sent after the AMF acquires UE's relevant information and determines that the UE is to use an IMS voice service according to the UE's relevant information;

where the relevant information includes at least one of the following information: UE's usage setting information, UE's access network information, and UE's subscription information.

In an embodiment, the determining that the UE is to use the IMS voice service according to the UE's relevant information includes:

when the UE's usage setting information is voice centric, determining that the UE is to use the IMS voice service; or when a network slice identified by single network slice selection assistance information (S-NSSAI) requested in the UE's access network information is able to access the IMS voice service, determining that the UE is to use the IMS voice service; or when an IP multimedia subsystem access point name (IMS APN) is included in the UE's subscription information, determining that the UE is to use the IMS voice service.

In yet another embodiment of the present application provides an AMF, including:

a first determining device, configured to determine to send a UE capability match request to a base station during a registration procedure initiated by the UE;

a first processing device, configured to send a request for setting up a UE AS security context to the base station, and send a UE capability match request to the base station after it is determined that the base station completes setup of the AS security context; and a first receiving device, configured to receive a UE capability match acknowledgement returned from the base station;

where the UE capability match acknowledgement is generated by the base station according to UE capability information, and the UE capability information is acquired from the UE by the base station after the setup of the AS security context is completed.

In one embodiment of the present application provides another AMF, including a memory, a processor, and a program stored in the memory and executable by the processor, where the program, when being executed by the processor, causes the processor to perform the following steps:

determining to send a UE capability match request to a base station during a registration procedure initiated by the UE;

sending a request for setting up a UE's access stratum (AS) security context to the base station, and sending the UE capability match request to the base station after it is determined that the base station completes the setup of the AS security context; and receiving a UE capability match acknowledgement returned from the base station;

where the UE capability match acknowledgement is generated by the base station according to UE capability information, and the UE capability information is acquired from the UE by the base station after the setup of the AS security context is completed.

In an embodiment, the determining to send the UE capability match request to the base station includes:

acquiring UE's relevant information, and determining to send the UE capability match request after determining that the UE is to use an IMS voice service according to the UE's relevant information;

where the relevant information includes at least one of the following information: UE's usage setting information, UE's access network information, and UE's subscription information.

In an embodiment, the determining that the UE is to use the IMS voice service according to the UE's relevant information includes:

when the UE's usage setting information is voice centric, determining that the UE is to use the IMS voice service; or when a network slice identified by single network slice selection assistance information (S-NSSAI) requested in the UE's access network information is able to access the IMS voice service, determining that the UE is to use the IMS voice service; or when an IP multimedia subsystem access point name (IMS APN) is included in the UE's subscription information, determining that the UE is to use the IMS voice service.

In one embodiment of the present application provides another AMF, including:

a second determining device, configured to determine to send a UE capability match request to a base station during a registration procedure initiated by the UE;

a second processing device, configured to send a UE capability match request to the base station, where the UE capability match request carries indication information for indicating the base station to ignore a UE's AS security context;

a second receiving device, configured to receive a UE capability match acknowledgement returned from the base station;

where the UE capability match acknowledgement is generated by the base station according to UE capability information, and the UE capability information is acquired from the UE by the base station according to the indication information for indicating the base station to ignore the UE AS security context.

In another embodiment of the present application provides another AMF, including a memory, a processor, and a program stored in the memory and executable by the processor, where the program, when being executed by the processor, causes the processor to perform the following steps:

determining to send a UE capability match request to a base station during a registration process of a terminal;

sending the UE capability match request to the base station, where the UE capability match request carries indication information for indicating the base station to ignore a UE access stratum security context;

receiving a UE capability match acknowledgement returned from the base station;

the UE capability match acknowledgement is generated by the base station according to UE capability information, and the UE capability information is acquired from the UE by the base station according to the indication information for indicating the base station to ignore the UE access stratum security context.

In an embodiment, the determining to send the UE capability match request to the base station includes:

acquiring UE's relevant information, determining to send the UE capability match request after determining that the UE is to use an IMS voice service according to the UE's relevant information;

the relevant information includes at least one of the following information: UE's usage setting information, UE's access network information, or UE's subscription information.

In an embodiment, the determining that the UE is to use the IMS voice service according to the UE's relevant information includes:

when the UE's usage setting information is voice centric, determining that the UE is to use the IMS voice service; or     when a network slice identified by single network slice selection assistance information (S-NSSAI) requested in the UE's access network information is able to access the IMS voice service, determining that the UE is to use the IMS voice service; or     when an IP multimedia subsystem access point name (IMS APN) is included in the UE's subscription information, determining that the UE is to use the IMS voice service.

In one embodiment of the present application provides a base station, including:

a third receiving device, configured to receive a UE capability match request sent by an AMF during a registration process of a UE, where the UE capability match request carries indication information for indicating a base station to ignore a UE AS security context; and     a sending device, configured to return a UE capability match acknowledgement to the AMF;

the UE capability match acknowledgement is generated by the base station according to UE capability information, and the UE capability information is acquired from the UE by the base station according to the indication information for indicating the base station to ignore a UE AS security context.

In one embodiment of the present application provides another base station, including a memory, a processor, and a program stored in the memory and executable by the processor, where the program, when being executed by the processor, causes the processor to perform the following steps:

receiving a UE capability match request sent by an access and mobility management function physical device (AMF) during a registration process of a terminal, where the UE capability match request carries indication information for indicating a base station to ignore a UE's AS security context; and     returning a UE capability match acknowledgement to the AMF;

the UE capability match acknowledgement is generated by the base station according to UE capability information, and the UE capability information is acquired from the UE by the base station according to the indication information for indicating the base station to ignore a UE access stratum security context.

In an embodiment, the UE capability match request is sent after the AMF acquires UE's relevant information and determines that the UE is to use an IMS voice service according to the UE's relevant information;

the relevant information includes at least one of the following information: UE's usage setting information, UE's access network information, and UE's subscription information.

In an embodiment, the determining that the UE is to use the IMS voice service according to the UE's relevant information includes:

when the UE's usage setting information is voice centric, determining that the UE is to use the IMS voice service; or     when a network slice identified by single network slice selection assistance information (S-NSSAI) requested in the UE's access network information is able to access the IMS voice service, determining that the UE is to use the IMS voice service; or     when IP multimedia subsystem access point name (IMS APN) is included in the UE's subscription information, determining that the UE is to use the IMS voice service.

In one embodiments of the present application provide a non-transitory computer readable storage medium, on which a computer program is stored, where the computer program, when being executed by a processor, causes the processor to perform the steps of the method according to the other embodiments.

In one embodiments of the present application provide another non-transitory computer-readable storage medium, on which a computer program is stored, where the computer program, when being executed by a processor, causes the processor to perform the steps of the method according to the other embodiments.

By the methods for checking the UE capability match, the AMFs, the base stations and the storage mediums according to the embodiments of the application, the problem that the base station does not respond to the UE capability match process requested by the AMF, which results in that the AMF cannot issue an indication of IMS voice over PS session to the UE during the registration process, can be avoided, and thus the UE can normally obtain IMS voice service.

BRIEF DESCRIPTION OF THE DRAWINGS

In order to more clearly illustrate solutions disclosed in the embodiments of the present application or the related art, the drawings used in the descriptions of the embodiments or the related art will be briefly described below. The drawings in the following description only show some embodiments of the present application.

DETAILED DESCRIPTION

In order to make the embodiments of the present application clearer, embodiments of the present application will be clearly and completely described below with reference to the drawings in the embodiments of the present application, and the described embodiments are some, but not all embodiments of the present application.

If an AMF requests more information related to UE radio capability support in order to set an IMS voice over PS Session Supported Indication, the AMF may send a UE radio capability match request to an NG-RAN, such as a base station. This procedure is typically performed during a registration process or when the UE does not receive a voice support match indication (belonging to a 5GMM context). In one embodiment, the process comprises the steps of: the AMF sends UE capability match request to the base station, after the UE capability match request is received by the base station, if the base station has not received UE radio capability before, then the base station requests UE to upload UE radio capability information; the UE sends RRC UE capability information including UE radio capability information to the base station; the base station checks whether the UE radio capability is compatible with the network configuration that ensures continuity of IMS-originated voice call service. To decide the appropriate UE radio capability match response, the operator configures the base station to check whether the UE supports the specific capabilities required for IMS PS voice call continuity. If the base station requests radio capability from the UE, the base station also sends the UE radio capability to the AMF, and the AMF stores the UE radio capability.

However, according to the new requirement of 3GPP SA3, the 5G base station needs to activate AS security of the UE when acquiring UE radio capability from the UE. In the procedure of registering the UE in the network, if the UE does not set up the user plane connection, the base station may not set up AS security context for the UE, and therefore, during the registration process, the base station is unable to acquire the UE radio capability, that is, the base station is unable to determine whether the UE radio capability matches, and thus the AMF is unable to send the indication of the IMS voice over PS session during the registration process, which results in the UE being unable to initiate IMS voice services. In order to solve the above problems in the related art, embodiments of the present application propose a method for in which an indication of IMS voice over PS session is provided by an AMF to a UE during a registration procedure initiated by the UE, to avoid that the base station does not respond to the UE capability match process of the AMF, the AMF fails to issue an indication of the IMS voice over PS session during the registration process, to prevent the UE from failing to obtain an IMS voice service.

Figure 1:
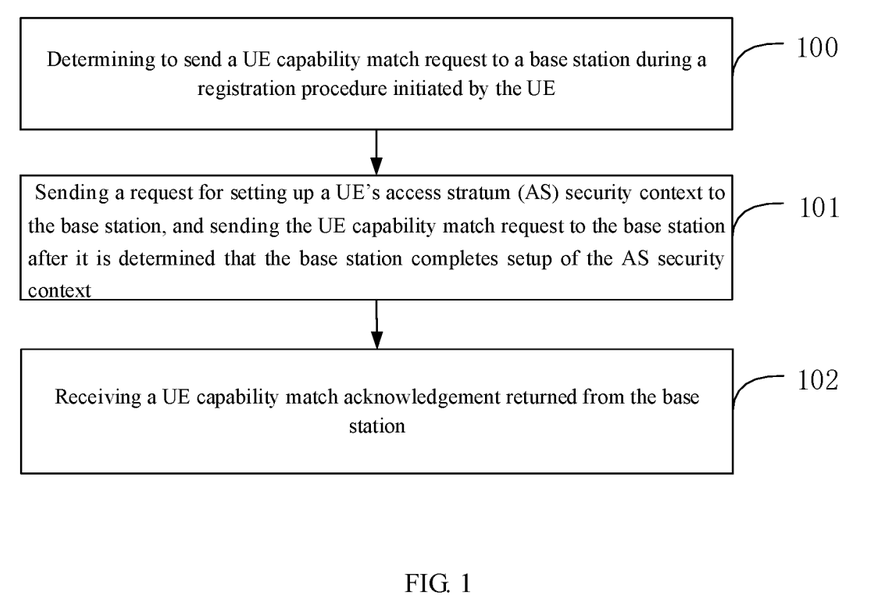
FIG. 1 shows a method for checking UE capability match according to an embodiment of the present application.

FIG. 1 shows a method for checking UE capability match according to an embodiment of the present application. As shown in FIG. 1, the method includes at least the following steps:

Step 100, determining to send a UE capability match request to a base station during a registration procedure initiated by the UE.

During the registration procedure initiated by the UE, since the AMF requests more information related to the UE radio capability support in order to set the IMS voice over PS Session Supported Indication, the AMF may determine to send the UE radio capability match request to an NG-RAN, for example, a base station, to request the base station to check whether the UE radio capability is compatible with a network configuration that ensures continuity of IMS-originated voice call service.

Step 101, sending a request for setting up a UE's access stratum (AS) security context to the base station, and sending the UE capability match request to the base station after it is determined that the base station completes setup of the AS security context.

After the AMF determines to send the UE capability match request to the base station, the AMF in the embodiment of the application firstly sends a request to the base station and firstly requests the base station to set up the UE's AS security context. After receiving the request for setting up the UE AS security context, the base station completes the setup of the UE AS security context. After determining that the base station completes the setup of the UE AS security context, the AMF requests the base station to execute a UE capability match procedure, namely the AMF sends a UE capability match request to the base station, namely the AMF needs to request the base station to check whether the UE radio capability and the base station capability match; after determining the UE radio capability match, the AMF sends an indication of IMS voice over PS session to the UE.

Step 102, receiving a UE capability match acknowledgement returned from the base station.

After receiving the UE capability match request sent by the AMF, the base station checks whether the UE radio capability and the base station capacity match, and informs the AMF after it is determined that they match; then the AMF sends indication of IMS voice over PS session to the UE after learning that the UE radio capability matches.

The UE capability match acknowledgement is generated by the base station according to the UE capability information, specifically, the UE capability match acknowledgement is generated after the base station determines that the UE radio capability and the base station capacity match each other. Further, the UE capability information is obtained from the UE by the base station after the UE AS security context is set up.

In the method for checking UE capability match according to the embodiment of the present application, the AMF firstly requests the base station to set up the UE AS security context, and then requests the base station to execute the UE capability match process, and thus the problem that the base station does not respond to the UE capability match process requested by the AMF, which results in that the AMF cannot issue an indication of IMS voice over PS session to the UE during the registration process, can be avoided, and the UE can normally obtain IMS voice service.

On the basis of the above method embodiments, the determining, by the AMF, to send the UE capability match request to the base station includes:

acquiring UE's relevant information, and determining to send the UE capability match request after determining that the UE is to use an IMS voice service according to the UE's relevant information; the relevant information includes at least one of the following information: UE's usage setting information, UE's access network information, and UE's subscription information.

Correspondingly, the determining that the UE is to use the IMS voice service according to the UE's relevant information may include:

when the UE's usage setting information is voice centric, determining that the UE is to use the IMS voice service; or when a network slice identified by single network slice selection assistance information (S-NSSAI) requested in the UE's access network information is able to access the IMS voice service, determining that the UE is to use the IMS voice service; or when an IP multimedia subsystem access point name (IMS APN) is included in the UE's subscription information, determining that the UE is to use the IMS voice service.

In one embodiment, when the UE registers to the network, the AMF may determine that a UE capability match process is required to be performed according to at least one of the UE' usage setting information, the UE's access network information, and the UE's subscription information, for example:

the UE's usage setting information may be indicated by the usage setting, and when the usage setting is set to voice centric, it is determined to perform the UE capability match process and when the usage setting isn't set to voice centric, the UE capability match process is not performed;

the UE's access network information may be indicated by S-NSSAI of a network slice to which the UE is to access, and when the network slice identified by the requested S-NSSAI is able to access the IMS voice, it is determined to perform the UE capability match process. Otherwise, the UE capability match process is not performed; and the UE's subscription information indicates whether the IMS APN is present in the UE's subscription information, and when the UE's subscription information contains the IMS APN, it is determined to perform the UE capability match process. Otherwise, the UE capability match process is not performed.

By the method for checking the UE capability match, the AMF requests the base station to set up the security context, then requests the base station to check whether the UE capability and the base station capability match, and the AMF receives the checking result of the UE capability match from the base station, and problem that the base station does not respond to the UE capability match process of the AMF, which results in that the AMF fails to issue an indication of IMS voice over PS session to the UE during the registration process, can be avoided, and the UE can normally obtain IMS voice service.

Figure 2:
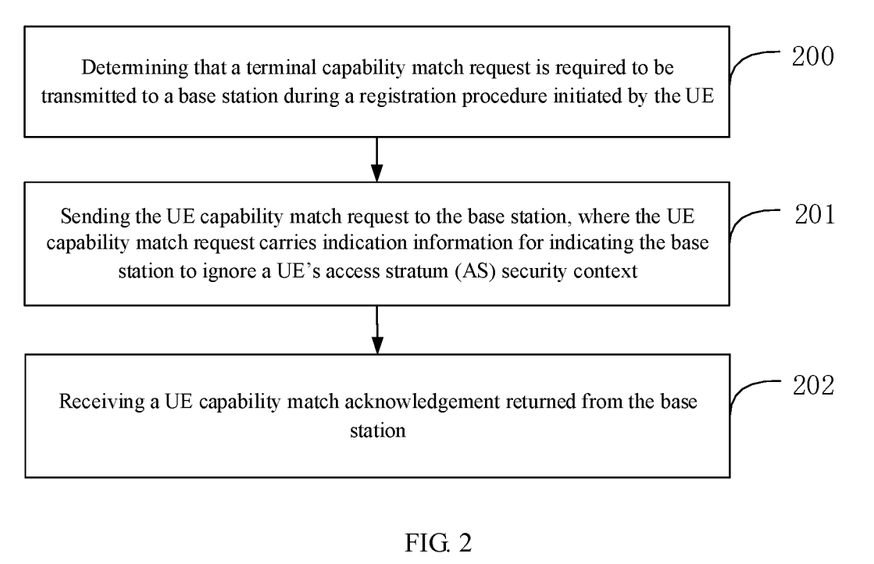
FIG. 2 shows a method for checking UE capability match according to another embodiment of the present application.

FIG. 2 shows a method for checking UE capability match according to another embodiment of the present application. As shown in FIG. 2, the method includes at least the following steps:

Step 200, determining to send a UE capability match request to a base station during a registration procedure initiated by the UE.

During the registration procedure initiated by the UE, since the AMF requests more information related to the UE radio capability support in order to set the IMS voice over PS Session Supported Indication, the AMF may determine to send the UE radio capability match request to an NG-RAN, for example, a base station, to request the base station to check whether the UE radio capability is compatible with a network configuration that ensures continuity of IMS-originated voice call service.

Step 201, sending the UE capability match request to the base station, where the UE capability match request carries indication information for indicating the base station to ignore a UE's access stratum (AS) security context.

In the embodiment of the application, the AMF sends the UE capability match request to the base station after determining to send the UE capability match request to the base station. Also, in the embodiment of the present application, the UE capability match request may carry indication information, where the indication information is used to indicate the base station to ignore indication information of the UE AS security context.

After receiving the UE capability match request carrying the indication information, the base station may request the UE for its radio capability, and check whether the UE radio capability and the base station capability match each other under the indication of the indication information and without setting up the UE AS security context. After it is determined the UE radio capability matches, the AMF sends an indication of IMS voice over PS session to the UE.

Step 202, receiving a UE capability match acknowledgement returned from the base station.

After receiving the UE capability match request sent by the AMF, the base station checks whether the UE radio capability and the base station capacity match, and informs the AMF after it is determined that they match; then the AMF sends indication of IMS voice over PS session to the UE after learning that the UE radio capability matches.

The UE capability match acknowledgement is generated by the base station according to UE capability information, specifically, the UE capability match acknowledgement is generated after the base station determines that the UE radio capability and the base station capacity match each other. Further, the UE capability information is obtained from the UE by the base station in case that the UE AS security context is ignored according to the indication information.

In the method for checking UE capability match according to the embodiment of the application, the AMF requests the base station to check whether the UE radio capability and the base station capability match, and the request carries an indication for ignoring the AS security, and thus the problem that the base station does not respond to the UE capability match process requested by the AMF, which causes that the AMF cannot issue an indication of IMS voice over PS session to the UE during the registration process, can be avoided, and the UE can normally obtain IMS voice service.

On the basis of the above method embodiments, the determining, by the AMF, to send the UE capability match request to the base station includes:

acquiring UE's relevant information, and determining to send the UE capability match request after determining that the terminal is to use an IMS voice service according to the UE's relevant information; the relevant information includes at least one of the following information: UE's usage setting information, UE's access network information, and UE's subscription information.

Correspondingly, the determining that the terminal is to use an IMS voice service according to the UE's relevant information may include:

when the UE's usage setting information is voice centric, determining that the UE is to use the IMS voice service; or when a network slice identified by single network slice selection assistance information (S-NSSAI) requested in the UE's access network information is able to access the IMS voice service, determining that the UE is to use the IMS voice service; or when an IP multimedia subsystem access point name (IMS APN) is included in the UE's subscription information, determining that the UE is to use the IMS voice service.

In one embodiment, when the UE is registered into the network, the AMF may determine that a UE capability match process is required to be performed according to at least one of the UE's usage setting information, the UE's access network information, and the UE's subscription information, for example:

the UE's usage setting information may be indicated by the usage setting, and when the usage setting is set to voice centric, it is determined to perform the UE capability match process, and when the usage setting isn't set to voice centric, the UE capability match process is not performed;

the UE's access network information may be indicated by a S-NSSAI of a network slice to which the UE is to access and when the network slice identified by the requested S-NSSAI is able to access the IMS voice, it is determined to perform the UE capability match process and when the network slice identified by the requested S-NSSAI is unable to access the IMS voice, the UE capability match process is not performed;

the UE subscription information indicates whether the IMS APN is present in the UE's subscription information, and when the UE's subscription information contains the IMS APN, it is determined to perform the UE capability match process. When the UE's subscription information contains no IMS APN, the UE capability match process is not performed.

By the method for checking UE capability match according to the embodiment of the application, the AMF requests the base station to check whether the UE radio capability and the base station capacity match, the request carries an indication for ignoring the AS security, and the AMF receives the checking result of the UE capability match from the base station, and thus the problem that the base station does not respond to the UE capability match process of the AMF, which results in that the AMF fails to issue an indication of IMS voice over PS session to the UE during the registration process, can be avoided, and the UE can normally obtain IMS voice service.

Figure 3:
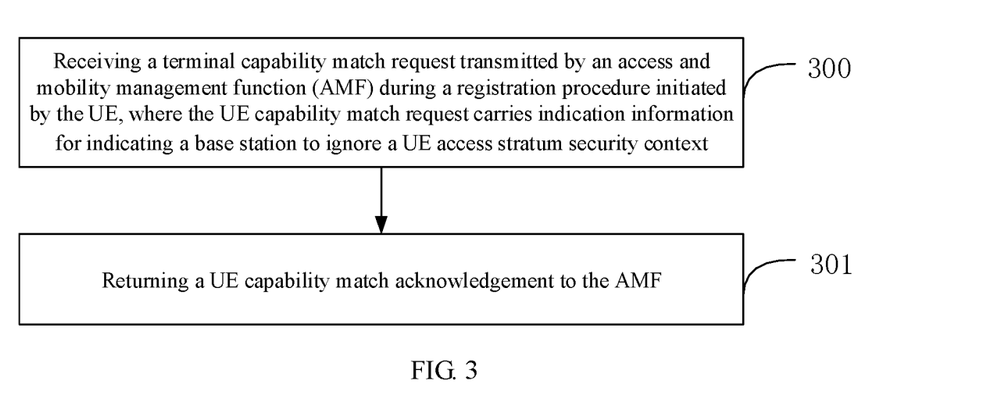
FIG. 3 shows a method for checking UE capability match according to another embodiment of the present application.

FIG. 3 shows a method for checking UE capability match according to another embodiment of the present application. As shown in FIG. 3, the method includes at least the following steps:

Step 300, receiving a UE capability match request sent by an access and mobility management function physical device (AMF) during a registration procedure initiated by the UE, where the UE capability match request carries indication information for indicating a base station to ignore a UE AS security context.

During the registration procedure initiated by the UE, since the AMF requests more information related to the UE radio capability support in order to set the IMS voice over PS Session Supported Indication, the AMF may determine to send a UE radio capability match request to an NG-RAN, for example, a base station, to request the base station to check whether the UE radio capability is compatible with a network configuration that ensures continuity of IMS-originated voice call service.

In the embodiment of the present application, the AMF sends the UE capability match request to the base station after determining to send the UE capability match request to the base station, in addition, in the embodiment of the present application, the UE capability match request may carry indication information, where the indication information is used to indicate the base station to ignore indication information of the UE AS security context.

After receiving the UE capability match request carrying the indication information, the base station may request the UE for its radio capability, and check whether the UE radio capability and the base station capability match each other under the indication of the indication information and without setting up the UE AS security context. After it is determined that the UE radio capability matches, the AMF sends an indication of IMS voice over PS session to the UE.

Step 301, returning a UE capability match acknowledgement to the AMF.

The UE capability match acknowledgement is generated by the base station according to the UE capability information, and the UE capability information is acquired from the UE by the base station in case that the UE AS security context is ignored according to the indication information.

After receiving the UE capability match request sent by the AMF, the base station checks whether the UE radio capability and the base station capacity match, and informs the AMF after it is determined that they match; then the AMF sends indication of IMS voice over PS session to the UE after learning that the UE radio capability matches.

The UE capability match acknowledgement is generated by the base station according to the UE capability information, specifically, the UE capability match acknowledgement is generated after the base station determines that the UE radio capability and the base station capacity match each other. Further, the UE capability information is obtained from the UE by the base station in case that the UE AS security context is ignored according to the indication information.

By the method for checking UE capability match according to the embodiment of the application, the AMF requests the base station to check whether the UE capability and the base station capacity match, and the request carries an indication for ignoring the AS security, thus the problem that the base station does not respond to the UE capability match process of the AMF, which causes that the AMF cannot issue an indication of IMS voice over PS session to the UE during the registration process, can be avoided, and the UE can normally obtain IMS voice service.

On the basis of the above method embodiments, the UE capability match request is sent after the AMF acquires the UE's relevant information and determines that the UE is to use an IMS voice service according to the UE's relevant information; the relevant information includes at least one of the following information: UE's usage setting information, UE's access network information, and UE's subscription information.

Correspondingly, the determining that the UE is to use the IMS voice service according to the UE's relevant information may include:

when the UE's usage setting information is voice centric, determining that the UE is to use the IMS voice service; or when a network slice identified by single network slice selection assistance information (S-NSSAI) requested in the UE's access network information is able to access the IMS voice service, determining that the UE is to use the IMS voice service; or when an IP multimedia subsystem access point name (IMS APN) is included in the UE's subscription information, determining that the UE is to use the IMS voice service.

In one embodiment, when the UE is registered into the network, the AMF may determine that a UE capability match process is required to be performed according to at least one of the UE's usage setting information, the UE's access network information, and the UE's subscription information, for example:

the UE's usage setting information may be indicated by the usage setting, and when the usage setting is set to voice centric, it is determined to perform the UE capability match process and when the usage setting isn't set to voice centric, the UE capability match process is not performed;

the UE's access network information may be indicated by a S-NSSAI of network slice to which the UE is to access and when the network slice identified by the requested S-NSSAI is able to access the IMS voice, it is determined to perform d the UE capability match process and when the network slice identified by the requested S-NSSAI is unable to access the IMS voice, the UE capability match process is not performed;

the UE's subscription information indicates whether the IMS APN is present in the UE's subscription information and when the subscription information contains the IMS APN, it is determined to perform UE capability match process. When the UE's subscription information contains no IMS APN, UE capability match process is not performed.

By the method for checking UE capability match according to the embodiment of the application, the AMF requests the base station to check whether the UE capability and the base station capacity match, the request carries an indication for ignoring the AS security, and the AMF receives the checking result of the UE capability match from the base station, and thus the problem that the base station does not respond to the UE capability match process of the AMF, which causes that the AMF cannot issue an indication of IMS voice over PS session to the UE during the registration process, can be avoided, and the UE can normally obtain IMS voice service.

Figure 4:
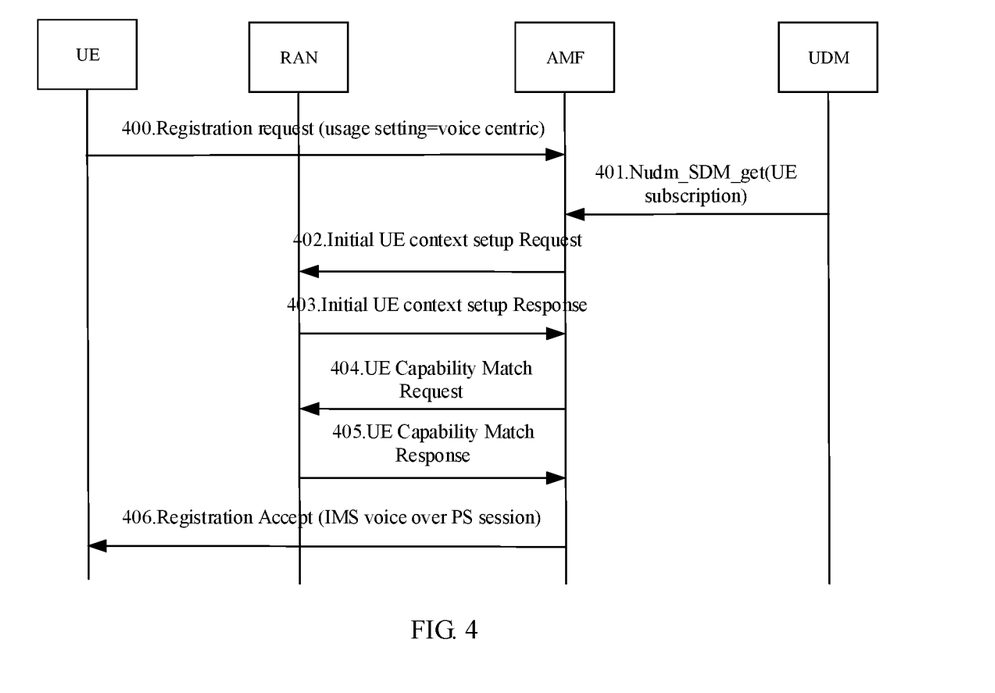
FIG. 4 shows a method for checking UE capability match according to still another embodiment of the present application.

FIG. 4 shows a method for checking UE capability match according to another embodiment of the present application. As shown in FIG. 4, in the method, an AMF determines that a RAN is requested to set up an AS security context first, and the method specifically includes:

step 400, acquiring, by the AMF, UE usage setting and requested S-NSSAI from a UE's registration request;

step 401, obtaining, by the AMF, UE's subscription information, including PN information subscribed by the UE, from the UDM;

step 402, determining, by the AMF, that the UE may need to initiate IMS voice call in case that the UE usage setting is voice centric, the network slice indicated by the requested S-NSSAI is able to access the IMS voice service, and an IMS APN is subscribed by the UE, and determining that the RAN is requested to set up UE AS security context, and sending a request for setting up the UE AS security context to the RAN;

during the registration process, the AMF determines that the UE needs to use the IMS voice according to the UE usage setting and/or the IMS APN subscribed by of the UE;

step 403, receiving, by the AMF, a response of completing the setup of the UE AS security context returned by the RAN;

the AMF sends Initial UE Context Setup request to RAN, and the RAN sets up UE AS security Context, and returns response.

Step 404, after determining that the RAN completes setup of UE security context, initiating, by the AMF, a UE capability match process and sending a UE capability match request to the RAN;

the AMF sends a UE Capability Match Request to the RAN.

Step 405, receiving, by the AMF, a UE capability match acknowledgement sent by the RAN;

the RAN requests radio capability from the UE, checks whether UE radio capability and base station capability match, and informs the AMF after matching is determined.

Step 406, after determining that the UE capability matches, the AMF continuing the normal registration process.

The AMF sends an indication of IMS voice over PS session to the UE after learning that the UE radio capability matches.

Figure 5:
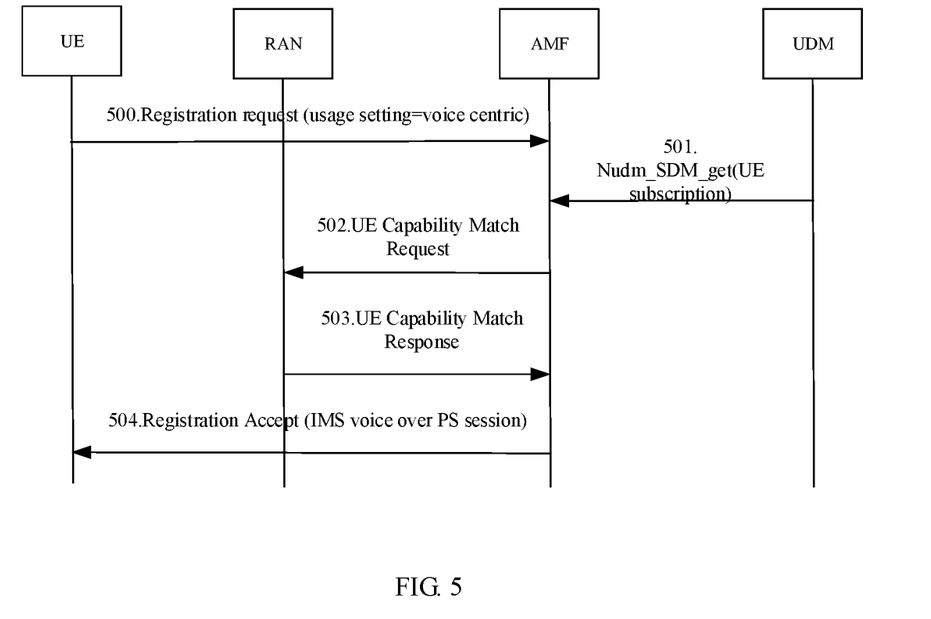
FIG. 5 shows a method for checking UE capability match according to yet another embodiment of the present application.

FIG. 5 shows a method for checking UE capability match according to another embodiment of the present application. As shown in FIG. 5, in the method, the AMF determines that UE AS security context is not set up, and the method specifically includes:

step 500, acquiring, by the AMF, UE usage setting and requested S-NSSAI from a UE's registration request;

step 501, acquiring, by the AMF, UE's subscription information including APN information subscribed by the UE, from the UDM;

step 502, determining, by the AMF, that the UE may need to initiate IMS voice call in case that the UE usage setting is voice centric, the network slice indicated by the requested S-NSSAI is able to access the IMS voice service, and an IMS APN is subscribed by the UE, determining that the RAN is requested to ignore the UE AS security context and a process of obtaining UE radio capability from the UE is performed; initiating, by the AMF, a UE capability match process, and sending the UE Capability Match Request carrying an indication for ignoring the UE security context to the RAN.

During the registration process, the AMF determines that the UE needs to use the IMS voice according to the UE usage setting and/or the IMS APN subscribed by the UE.

Step 503, when returning the result of UE capability match, only returning, by the RAN, whether checking the UE radio capability match is successful, without providing the obtained UE radio capability information to the AMF.

After receiving the indication, the RAN acquires the UE radio capability from the UE even if the UE AS security context is absent, checks whether the UE radio capability and the base station capacity match, and informs the AMF after matching is determined.

Step 504, after determining the UE capability matches, continuing, by the AMF, the normal registration process.

After knowing the UE radio capability matches, the AMF sends an indication of IMS voice over PS session to the UE.

Figure 6:
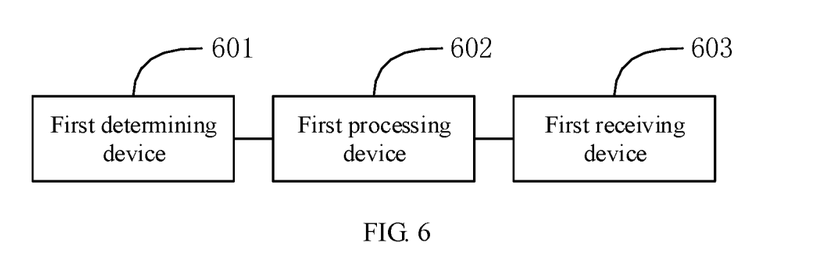
FIG. 6 is a schematic structural diagram of an AMF according to an embodiment of the present application.

FIG. 6 is a schematic structural diagram of an AMF according to an embodiment of the present application. As shown in FIG. 6, the AMF includes a first determining device 601, a first processing device 602, and a first receiving device 603, where:

the first determining device 601 is configured to determine to send a UE capability match request to a base station in a registration procedure initiated by the UE;

the first processing device 602 is configured to send a request for setting up a UE' access stratum (AS) security context to the base station, and send the UE capability match request to the base station after it is determined that the base station completes setup of the AS security context;

the first receiving device 603 is configured to receive a UE capability match acknowledgement returned from the base station;

the UE capability match acknowledgement is generated by the base station according to UE capability information, and the UE capability information is acquired from the UE by the base station after the setup of the AS security context is completed.

In one embodiment, during the registration procedure initiated by the UE, since the AMF requests more information related to the UE radio capability support in order to set the IMS voice over PS Session Supported Indication, the AMF may determine, through the first determining device 601, to send a UE radio capability match request to the NG-RAN, for example, the base station, to request the base station to check whether the UE radio capability is compatible with the network configuration that ensures the continuity of IMS-initiated voice call service.

After the first determining device 601 determines to send the UE capability match request to the base station, in the embodiment of the present application, the AMF firstly sends a request to the base station through the first processing device 602, and firstly requests the base station to set up an UE access stratum security context (AS security context). After receiving the request for setting up the UE AS security context, the base station completes the setup of the UE AS security context. After the AMF determines that the base station sets up the UE AS security context, the AMF requests the base station to perform a UE capability match process, that is, the first processing device 602 sends the UE capability match request to the base station. The first receiving device 603 receives the UE capability match acknowledgement returned from the base station, and after determining the UE radio capability matches, sends an indication of IMS voice over PS session to the UE.

The UE capability match acknowledgement is generated by the base station according to the UE capability information, specifically, the UE capability match acknowledgement is generated after the base station determines the UE radio capability and the base station capacity match each other. Further, the UE capability information is obtained from the UE by the base station after the UE AS security context is set up.

By the method for checking UE capability match according to the embodiment of the application, the AMF firstly requests the base station to set up the UE AS security context, and then requests the base station to perform the UE capability match process, and the problem that the base station does not respond to the UE capability match process of the AMF, which causes that the AMF fails to issue an indication of IMS voice over PS session to the UE during the registration process, can be avoided, and the UE can normally obtain IMS voice service.

Figure 7:
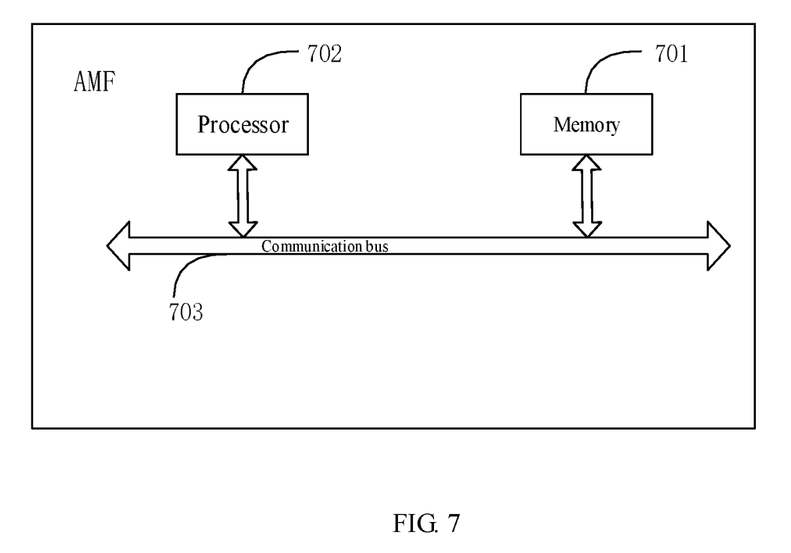
FIG. 7 is a schematic structural diagram of an AMF according to another embodiment of the present application.

FIG. 7 is a schematic structural diagram of an AMF according to another embodiment of the present application. As shown in FIG. 7, the AMF includes a memory 701, a processor 702, and a program stored in the memory 701 and executable on the processor 702, where the memory 701 and the processor 702 communicate with each other through a communication bus 703, and the program, when executed on the processor 702, causes the processor 702 to perform the following steps:

determining to send a UE capability match request to a base station during a registration procedure initiated by the UE;

sending a request for setting up a UE access stratum security context to the base station, and sending the UE capability match request to the base station after it is determined that the base station completes setup of the access stratum (AS) security context; and receiving a UE capability match acknowledgement returned from the base station;

where the UE capability match acknowledgement is generated by the base station according to UE capability information, and the UE capability information is acquired from the UE by the base station after the AS security context is set up.

On the basis of the above method embodiment, the determining to send the UE capability match request to the base station includes:

acquiring UE's relevant information, and determining to send UE capability match request after determining that the UE is to use an IMS voice service according to the UE's relevant information;

where the relevant information includes at least one of the following information: UE's usage setting information, UE's access network information, and UE's subscription information.

On the basis of the above method embodiment, the determining that the UE is to use the IMS voice service according to the UE's relevant information includes:

when the UE's usage setting information is voice centric, determining that the UE is to use the IMS voice service; or when a network slice identified by single network slice selection assistance information (S-NSSAI) requested in the UE's access network information is able to access the IMS voice service, determining that the UE is to use the IMS voice service; or when an IP multimedia subsystem access point name (IMS APN) is included in the UE's subscription information, determining that the UE is to use the IMS voice service.

In addition, the computer program in the memory 701 may be implemented in the form of a software functional unit and may be stored in a computer readable storage medium when the computer program is sold or used as a stand-alone product. The solution of the present application or a part thereof which substantially contributes to the related art may be embodied in the form of a software product, which is stored in a storage medium and includes several instructions for causing a computer device (which may be a personal computer, a server, or a network device)

to execute all or part of the steps of the method according to the embodiments of the present application. And the aforementioned storage medium includes: U-disk, mobile hard disk, Read-Only Memory (ROM), Random Access Memory (RAM), magnetic disk, compact disk, and various media capable of storing program codes.

The method flow related to the execution of the program by the processor 702 may specifically refer to the above method embodiments, and details are not repeated here.

Figure 8:
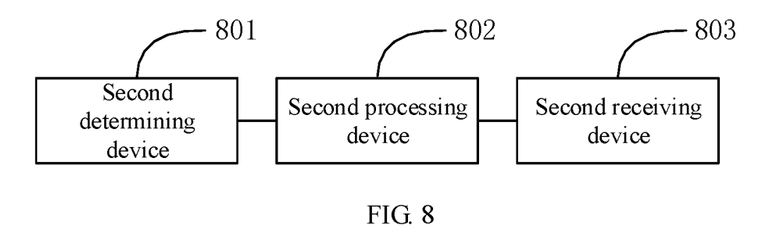
FIG. 8 is a schematic structural diagram of an AMF according to yet another embodiment of the present application.

FIG. 8 is a schematic structural diagram of an AMF according to still another embodiment of the present application. As shown in FIG. 8, the AMF includes a second determining device 801, a second processing device 802, and a second receiving device 803, where:

the second determining device 801 is configured to determine o send a UE capability match request to a base station during a registration procedure initiated by the UE;

the second processing device 802 is configured to send the UE capability match request to the base station, where the UE capability match request carries indication information for indicating the base station to ignore a UE AS security context; and the second receiving device 803 is configured to receive a UE capability match acknowledgement returned from the base station;

the UE capability match acknowledgement is generated by the base station according to UE capability information, and the UE capability information is acquired from the UE by the base station in case that the AS security context is ignored according to the indication information.

In one embodiment, during the registration procedure initiated by the UE, since the AMF requests more information related to the UE radio capability support in order to set the IMS voice over PS Session Supported Indication, the AMF may determine to send a UE radio capability match request to the NG-RAN, for example, the base station, through the second determination device 801, to request the base station to check whether the UE radio capability is compatible with a network configuration that ensures IMS-initiated voice call service continuity. After the second determining device 801 determines to send the UE capability match request to the base station, in the embodiment of the present application, the AMF sends the UE capability match request to the base station through the second processing device 802. In addition, in the embodiment of the present application, the UE capability match request may carry indication information for indicating the base station to ignore the indication information of the UE AS security context. After the base station receives the UE capability match request carrying the indication information, under the indication of the indication information and without setting up the UE AS security context, the base station may request the UE for its radio capability, and check whether the UE radio capability and the base station capability match each other. The second receiving device 803 receives the UE capability match acknowledgement returned from the base station, and after determining that the UE radio capability matches, sends the indication of the IMS voice over PS session to the UE.

The UE capability match acknowledgement is generated by the base station according to UE capability information, specifically, the UE capability match acknowledgement is generated after the base station determines the UE radio capability and the base station capacity match each other. Further, the UE capability information is obtained by the base station from the UE according to the indication information while ignoring the UE AS security context.

By the method for checking UE capability match according to the embodiment of the application, the AMF requests the base station to check whether the UE capability and the base station capacity match, and the request carries an indication for ignoring the AS security, thus the problem that the base station does not respond to the UE capability match process of the AMF, which causes that the AMF cannot issue an indication of IMS voice over PS session to the UE during the registration process, can be avoided, and the UE can normally obtain IMS voice service.

Figure 9:
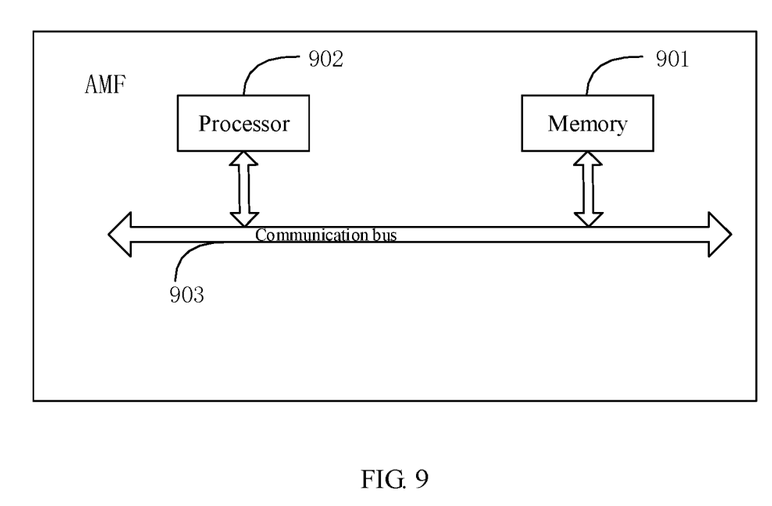
FIG. 9 is a schematic structural diagram of an AMF according to yet another embodiment of the present application.

FIG. 9 is a schematic structural diagram of an AMF according to another embodiment of the present application. As shown in FIG. 9, the AMF includes a memory 901, a processor 902 and a program stored in the memory 901 and executable on the processor 902, where the memory 901 and the processor 902 communicate with each other through a communication bus 903, and the program, when executed on the processor 902, causes the processor 902 to perform the following steps:

determining to send a UE capability match request to a base station during a registration procedure initiated by the UE;

sending the UE capability match request to the base station, where the UE capability match request carries indication information for indicating the base station to ignore a UE access stratum (AS) security context; and receiving a UE capability match acknowledgement returned from the base station;

where the UE capability match acknowledgement is generated by the base station according to UE capability information, and the UE capability information is acquired by the base station from the terminal in case that the UE AS security context is ignored according to the indication information.

On the basis of the above method embodiment, the determining to send the UE capability match request to the base station includes:

acquiring UE's relevant information, determining to send the UE capability match request after determining that the UE is to use an IMS voice service according to the UE's relevant information;

where the relevant information includes at least one of the following information: UE's usage setting information, UE's access network information, and UE's subscription information.

On the basis of the above method embodiment, the determining that the UE is to use the IMS voice service according to the UE's relevant information includes:

when the UE's usage setting information is voice centric, determining that the UE is to use the IMS voice service; or when a network slice identified by single network slice selection assistance information (S-NSSAI) requested in the UE's access network information is able to access the IMS voice service, determining that the UE is to use the IMS voice service; or when an IP multimedia subsystem access point name (IMS APN) is included in the UE's subscription information, determining that the UE is to use the IMS voice service.

In addition, the computer program in the memory 901 may be implemented in the form of a software functional unit and may be stored in a computer readable storage medium when the computer program is sold or used as a standalone product. Based on such understanding, the solution of the present application or a part thereof which substantially contributes to the related art may be embodied in the form of a software product, which is stored in a storage medium and includes several instructions for causing a computer device (which may be a personal computer, a server, or a network device) to execute all or part of the steps of the method according to the embodiments of the present application. And the aforementioned storage medium includes: U-disk, mobile hard disk, Read-Only Memory (ROM), Random Access Memory (RAM), magnetic disk, compact disk, and various media capable of storing program codes.

The processor 902 executes the method flow related to the program, which may refer to the above method embodiments specifically, and is not repeated here.

Figure 10:
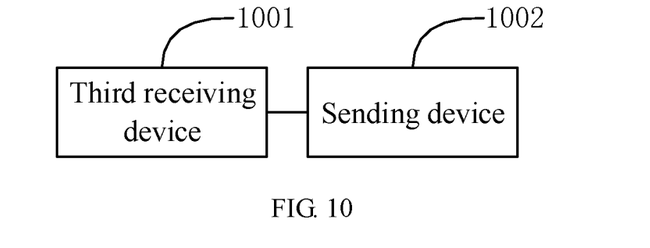
FIG. 10 is a schematic structural diagram of a base station according to an embodiment of the present application.

FIG. 10 is a schematic structural diagram of a base station according to an embodiment of the present application. As shown in FIG. 10, the base station includes a third receiving device 1001 and a sending device 1002, where:

the third receiving device 1001 is configured to receive a UE capability match request sent by an access and mobility management function physical device (AMF) during a registration process of a terminal, where the UE capability match request carries indication information for indicating a base station to ignore an access stratum security context of the terminal; and the sending device 1002 is configured to return a UE capability match acknowledgement to the AMF;

where the UE capability match acknowledgement is generated by the base station according to UE capability information, and the UE capability information is acquired from the terminal by the base station in case that the UE access stratum security context is ignored according to the indication information.

In one embodiment, after the AMF determines to send the UE capability match request to the base station, in the embodiment of the present application, the AMF sends the UE capability match request to the base station. In addition, in the embodiment of the present application, the UE capability match request may carry indication information for indicating the base station to ignore indication information of the UE AS security context. After the base station receives the UE capability match request carrying the indication information through the third receiving device 1001, under the indication of the indication information and without setting up the UE AS security context, the base station may request the UE for its radio capability, and check whether the UE radio capability and the base station capacity match each other. After determining that the UE radio capability matches, the AMF sends an indication of IMS voice over PS session to the UE. After receiving the UE capability match request sent by the AMF, the third receiving device 1001 checks whether the UE radio capability and the base station capability match, and notifies the AMF through the sending device 1002 after determining the UE radio capability matches; then the AMF sends indication of IMS voice over PS session to the UE after learning that the UE radio capability matches.

The UE capability match acknowledgement is generated by the base station according to UE capability information, specifically, the UE capability match acknowledgement is generated after the base station determines the UE radio capability and the base station capacity match each other. Further, the UE capability information is obtained by the base station from the UE in case that the UE access stratum security context is ignored according to the indication information.

By the method for checking UE capability match according to the embodiment of the application, the AMF requests the base station to check whether the UE capability and the base station capacity match, and the request carries an indication for ignoring the AS security, and the problem that the base station does not respond to the UE capability match process of the AMF, which causes that the AMF cannot issue an indication of IMS voice over PS session to the UE during the registration process, can be avoided, and the UE can normally obtain IMS voice service.

Figure 11:
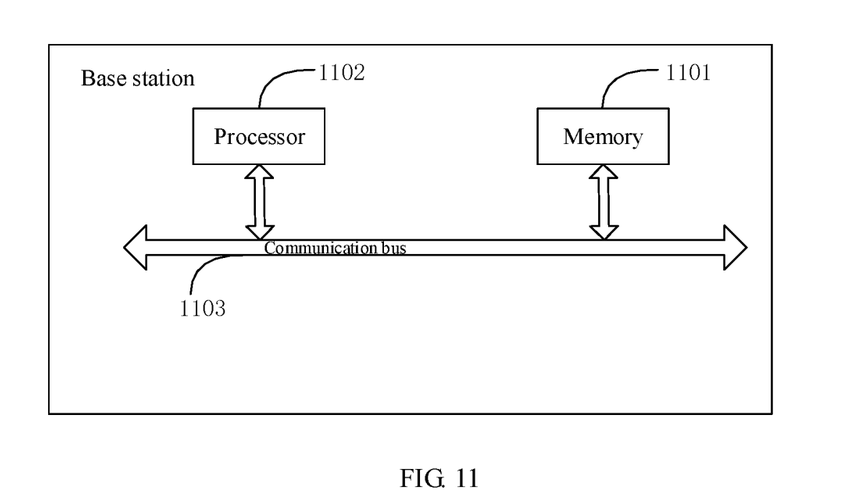
FIG. 11 is a schematic structural diagram of a base station according to another embodiment of the present application.

FIG. 11 is a schematic structural diagram of a base station according to another embodiment of the present application. As shown in FIG. 11, the terminal includes a memory 1101, a processor 1102, and a program stored in the memory 1101 and executable by the processor 1102, where the memory 1101 and the processor 1102 communicate with each other through a communication bus 1103, and the program, when executed by the processor 1102, causes the processor 1102 to perform the following steps:

receiving a UE capability match request sent by an access and mobility management function physical device (AMF) during a registration procedure initiated by the UE, where the UE capability match request carries indication information for indicating a base station to ignore a UE access stratum security context; and returning a UE capability match acknowledgement to the AMF;

where the UE capability match acknowledgement is generated by the base station according to UE capability information, and the UE capability information is acquired from the UE by the base station in case that the UE access stratum security context is ignored according to the indication information.

In the above method embodiment, the UE capability match request is sent after the AMF acquires the UE's relevant information and determines that the terminal is to use IMS voice service according to the UE's relevant information;

the relevant information includes at least one of the following information: UE's usage setting information, UE's access network information, and UE's subscription information.

In the above method embodiment, the determining that the UE is to use the IMS voice service according to the UE's relevant information includes:

when the UE's usage setting information is voice centric, determining that the UE is to use the IMS voice service; or when a network slice identified by network slice identified by single network slice selection assistance information (S-NSSAI) requested in the UE's access network information is able to access the IMS voice service, determining that the UE is to use the IMS voice service; or when an IP multimedia subsystem access point name (IMS APN) is included in the UE's subscription information, determining that the UE is to use the IMS voice service.

Further, the computer program in the memory 1101 may be implemented in the form of a software functional unit and stored in a computer readable storage medium when the computer program is sold or used as a separate product. Based on such understanding, the solution of the present application or a part thereof which substantially contributes to the related art may be embodied in the form of a software product, which is stored in a storage medium and includes several instructions for causing a computer device (which may be a personal computer, a server, or a network device)

to execute all or part of the steps of the method according to the embodiments of the present application. And the aforementioned storage medium includes: U-disk, mobile hard disk, Read-Only Memory (ROM), Random Access Memory (RAM), magnetic disk, compact disk, and various media capable of storing program codes.

The method flow related to the execution of the program by the processor 1102 may specifically refer to the above method embodiment, and is not repeated here.

The non-transitory computer-readable storage medium according to the embodiments of the present application is specifically configured to execute the process of the method for checking the UE capability match provided in the foregoing method embodiments, and specific functions and processes of the process may be referred to in the foregoing method embodiments, which are not repeated here.

The above-described embodiments of the apparatus are merely illustrative, and the units described as separate parts may or may not be physically separate, and parts displayed as units may or may not be physical units, may be located in one position, or may be distributed on multiple network units. Some or all of the devices may be selected according to actual needs to achieve the objective of the solution of this embodiment.

Through the above description of the embodiments, each embodiment may be implemented by software plus a necessary general hardware platform, and may also be implemented by hardware. Based on such understanding, the above solutions substantially or otherwise contributing to the related art may be embodied in the form of a software product, which may be stored in a computer-readable storage medium, such as ROM/RAM, magnetic disk, compact disk, etc., and includes several instructions for causing a computer device (which may be a personal computer, a server, or a network device, etc.) to execute the method according to the various embodiments or some parts of the embodiments.

What is claimed is:

1. A method for checking UE capability match, comprising:
   determining to send a UE capability match request to a base station during a registration procedure initiated by the UE;
   sending a request for setting up a UE's access stratum (AS) security context to the base station, and sending the UE capability match request to the base station after it is determined that the base station completes setup of the AS security context; and
   receiving a UE capability match acknowledgement returned from the base station;
   wherein the UE capability match acknowledgement is generated by the base station according to UE capability information, and the UE capability information is acquired from the UE by the base station after the setup of the AS security context is completed.

2. The method of claim 1, wherein the determining to send the UE capability match request to the base station comprises:
   acquiring UE's relevant information, and determining to send the UE capability match request after determining that the UE is to use an IP multimedia subsystem (IMS) voice service according to the UE's relevant information;
   wherein the relevant information comprises at least one of the following information: UE's usage setting information, UE's access network information, and UE's subscription information.

3. The method of claim 2, wherein the determining that the UE is to use the IMS voice service according to the UE's relevant information comprises:
   when the UE's usage setting information is voice centric, determining that the UE is to use the IMS voice service; or
   when a network slice identified by single network slice selection assistance information (S-NSSAI) requested in the UE's access network information is configured to access the IMS voice service, determining that the UE is to use the IMS voice service; or
   when an IP multimedia subsystem access point name (IMS APN) is included in the UE's subscription information, determining that the UE is to use the IMS voice service.

4. An access and mobility management function physical device (AMF), comprising a memory, a processor and a program stored in the memory and executable by the processor, wherein the program, when executed by the processor, causes the processor to perform the steps of claim 1.

5. The AMF of claim 4, wherein the determining to send the UE capability match request to a base station comprises:
   acquiring UE's relevant information, and determining to send the UE capability match request after determining that the UE is to use an IP multimedia subsystem (IMS) voice service according to the UE's relevant information;
   wherein the relevant information comprises at least one of the following information: UE's usage setting information, UE's access network information, and UE's subscription information.

6. The AMF of claim 5, wherein the determining that the UE is to use the IMS voice services according to the UE's relevant information comprises:
   when the UE's usage setting information is voice centric, determining that the UE is to use the IMS voice service; or
   when a network slice identified by single network slice selection assistance information (S-NSSAI) requested in the UE's access network information is configured to access the IMS voice service, determining that the UE is to use the IMS voice service; or
   when an IP multimedia subsystem access point name (IMS APN) is included in the UE's subscription information, determining that the UE is to use the IMS voice service.

7. A non-transitory computer-readable storage medium, having a computer program stored thereon, wherein the computer program, when executed by a processor, causes the processor to perform the steps of claim 1.

8. A method for checking UE capability match, comprising:
   determining to send a UE capability match request to a base station during a registration procedure initiated by the UE;
   sending the UE capability match request to the base station, where the UE capability match request carries indication information for indicating the base station to ignore a UE access stratum (AS) security context; and
   receiving a capability match acknowledgement returned from the base station;
   wherein the capability match acknowledgement is generated by the base station according to UE capability information, and the UE capability information is acquired from the UE by the base station in case that the UE AS security context is ignored according to indication information.

9. The method of claim 8, wherein the determining to send the UE capability match request to the base station comprises:
   acquiring UE's relevant information, and determining to send the UE capability match request after determining that the UE is to use an IP multimedia subsystem (IMS) voice service according to the UE's relevant information;
   wherein the relevant information comprises at least one of the following information: UE's usage setting information, UE's access network information, and UE's subscription information.

10. The method of claim 9, wherein the determining that the UE is to use the IMS voice service according to the UE's relevant information comprises:
   when the UE's usage setting information is voice centric, determining that the UE is to use the IMS voice service; or
   when a network slice identified by single network slice selection assistance information (S-NSSAI) requested in the UE's access network information is configured to access the IMS voice service, determining that the UE is to use the IMS voice service; or
   when an IP multimedia subsystem access point name (IMS APN) is included in the UE's subscription information, determining that the UE is to use the IMS voice service.

11. An access and mobility management function physical device (AMF), comprising a memory, a processor and a program stored in the memory and executable by the processor, wherein the program, when executed by the processor, causes the processor to perform the steps of claim 8.

12. The AMF of claim 11, wherein the determining to send the UE capability match request to the base station comprises:
   acquiring UE's relevant information, and determining to send the UE capability match request after determining that the UE is to use an IP multimedia subsystem (IMS) voice service according to the UE's relevant information;
   wherein the relevant information comprises at least one of the following information: UE's usage setting information, UE's access network information, and UE's subscription information.

13. The AMF of claim 12, wherein the determining that the UE is to use the IMS voice services according to the UE's relevant information comprises:
   when the UE's usage setting information is voice centric, determining that the UE is to use the IMS voice service; or
   when a network slice identified by single network slice selection assistance information (S-NSSAI) requested in the UE's access network information is configured to access the IMS voice service, determining that the UE is to use the IMS voice service; or
   when an IP multimedia subsystem access point name (IMS APN) is included in the UE's subscription information, determining that the UE is to use the IMS voice service.

14. A method for checking UE capability match, comprising:
   receiving a UE capability match request sent by an access and mobility management function physical device (AMF) during a registration procedure initiated by the UE, where the UE capability match request carries indication information for indicating a base station to ignore a UE access stratum (AS) security context; and
   returning a UE capability match acknowledgement to the AMF;
   wherein the UE capability match acknowledgement is generated by the base station according to the UE capability information, and the UE capability information is acquired from the UE by the base station in case that the UE AS security context is ignored according to the indication information.

15. A non-transitory computer-readable storage medium, having a computer program stored thereon, wherein the computer program, when executed by a processor, causes the processor to perform the steps of claim 14.

16. The method of claim 14, wherein the UE capability match request is sent after the AMF acquires UE's relevant information and determines that the UE is to use an IP multimedia subsystem (IMS) voice service according to the UE's relevant information;
   wherein the relevant information comprises at least one of the following information: UE's usage setting information, UE's access network information, and UE's subscription information.

17. The method of claim 16, wherein the determining that the UE is to use the IMS voice service according to the UE's relevant information comprises:
   when the UE's usage setting information is voice centric, determining that the UE is to use the IMS voice service; or
   when a network slice identified by single network slice selection assistance information (S-NSSAI) requested in the UE's access network information is configured to access the IMS voice service, determining that the UE is to use the IMS voice service; or
   when an IP multimedia subsystem access point name (IMS APN) is included in the UE's subscription information, determining that the UE is to use the IMS voice service.

18. A base station comprising a memory, a processor, and a program stored in the memory and executable by the processor, wherein the program, when executed by the processor, causes the processor to perform the steps of claim 14.

19. The base station of claim 18, wherein the UE capability match request is sent after the AMF acquires UE's relevant information and determines that the UE is to use an IP multimedia subsystem (IMS) voice service according to the UE's relevant information;
   wherein the relevant information comprises at least one of the following information: UE's usage setting information, UE's access network information, and UE's subscription information.

20. The base station of claim 19, wherein the determining that the UE is to use the IMS voice service according to the UE's relevant information comprises:
   when the UE's usage setting information is voice centric, determining that the UE is to use the IMS voice service; or
   when a network slice identified by single network slice selection assistance information (S-NSSAI) requested in the UE's access network information is configured to access the IMS voice service, determining that the UE is to use the IMS voice service; or
   when an IP multimedia subsystem access point name (IMS APN) is included in the UE's subscription information, determining that the UE is to use the IMS voice service.

* * * * *